United States Patent

Slocum et al.

[11] Patent Number: 5,249,387
[45] Date of Patent: Oct. 5, 1993

[54] ICE FISHING APPARATUS

[76] Inventors: Edward W. Slocum, 7725 Grove Rd.; Daniel L. Slocum, 17 Green St., both of Franklinville, N.Y. 14737

[21] Appl. No.: 982,850

[22] Filed: Nov. 30, 1992

[51] Int. Cl.⁵ .............................................. A01K 97/12
[52] U.S. Cl. ................................................ 43/16; 43/17
[58] Field of Search ............................ 43/17, 15, 16

[56] References Cited

U.S. PATENT DOCUMENTS

| 4,016,670 | 4/1977 | Pihaja et al. | 43/17 |
| 4,079,537 | 3/1978 | Chretien | 43/17 |
| 4,393,615 | 7/1983 | Hodshire | 43/15 |
| 4,651,460 | 3/1987 | Sykes | 43/17 |
| 4,993,181 | 2/1991 | Cooper | 43/15 |

Primary Examiner—Mark Rosenbaum
Assistant Examiner—Chuck Y. Mah
Attorney, Agent, or Firm—Leon Gilden

[57] ABSTRACT

A base plate mounts a lift rod that has its forward end slidably directing a fishing line and a second end biased to a vertical orientation relative to the base plate, with a fishing reel laterally oriented relative to the lift rod directing fishing line along the lift rod through the lift rod first end along a release mechanism, whereupon a fish strike rotates the release mechanism to effect lifting of the lift rod for the indication and simultaneous securement and fixing of a hook relative to a fish.

4 Claims, 4 Drawing Sheets

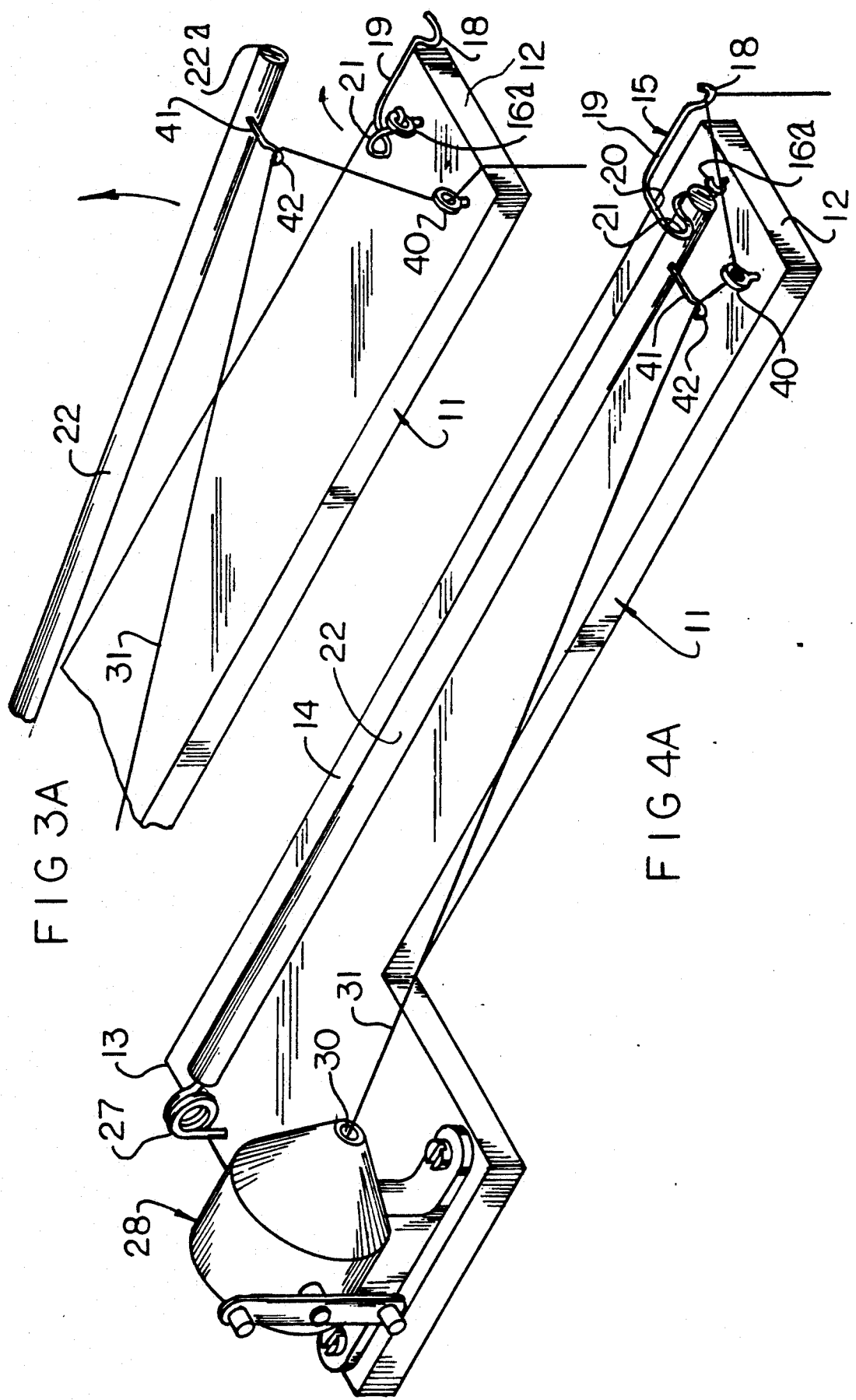

ICE FISHING APPARATUS

BACKGROUND OF THE INVENTION

1. Field of the Invention

The field of invention relates to fishing apparatus, and more particularly pertains to a new and improved ice fishing apparatus wherein the same is arranged to simultaneously indicate and fix a hook relative to a fish.

2. Description of the Prior Art

Ice fishing apparatus of various types have been indicated in the prior art and noted in the U.S. Pat. Nos. 4,993,183; 4,949,497; 4,980,986; 4,934,091; and 4,918,853.

The prior art has heretofore been primarily directed to the indication of a fish strike, wherein the instant invention effects both simultaneous indication and fixing of a hook relative to a fish in a fishing procedure.

Accordingly, there remains a need for a new and improved ice fishing apparatus as set forth by the instant invention which addresses both the problems of ease of use as well as effectiveness in construction and in this respect, the present invention substantially fulfills this need.

SUMMARY OF THE INVENTION

In view of the foregoing disadvantages inherent in the known types of fishing apparatus now present in the prior art, the present invention provides an ice fishing apparatus wherein a lift rod is arranged to indicate and fix a fishing hook relative to a fish during a fishing procedure. As such, the general purpose of the present invention, which will be described subsequently in greater detail, is to provide a new and improved ice fishing apparatus which has all the advantages of the prior art fishing apparatus and none of the disadvantages.

To attain this, the present invention provides a base plate mounting a lift rod that has its forward end slidably directing a fishing line and a second end biased to vertical orientation relative to the base plate, with a fishing reel laterally oriented relative to the lift rod directing fishing line along the lift rod through the lift rod first end along a release mechanism, whereupon a fish strike rotates the release mechanism to effect lifting of the lift rod for the indication and simultaneous securement and fixing of a hook relative to a fish.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved ice fishing apparatus which has all the advantages of the prior art fishing apparatus and none of the disadvantages.

It is another object of the present invention to provide a new and improved ice fishing apparatus which may be easily and efficiently manufactured and marketed.

It is a further object of the present invention to provide a new and improved ice fishing apparatus which is of a durable and reliable construction.

An even further object of the present invention is to provide a new and improved ice fishing apparatus which is susceptible of a low cost of manufacture with regard to both materials and labor, and which accordingly is then susceptible of low prices of sale to the consuming public, thereby making such ice fishing apparatus economically available to the buying public.

Still yet another object of the present invention is to provide a new and improved ice fishing apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3a is an isometric illustration of a modified aspect of the invention in a first position.

FIG. 4a is an isometric illustration of a modified aspect of the invention in a second position.

DESCRIPTION OF THE PREFERRED EMBODIMENT

Figure 1:
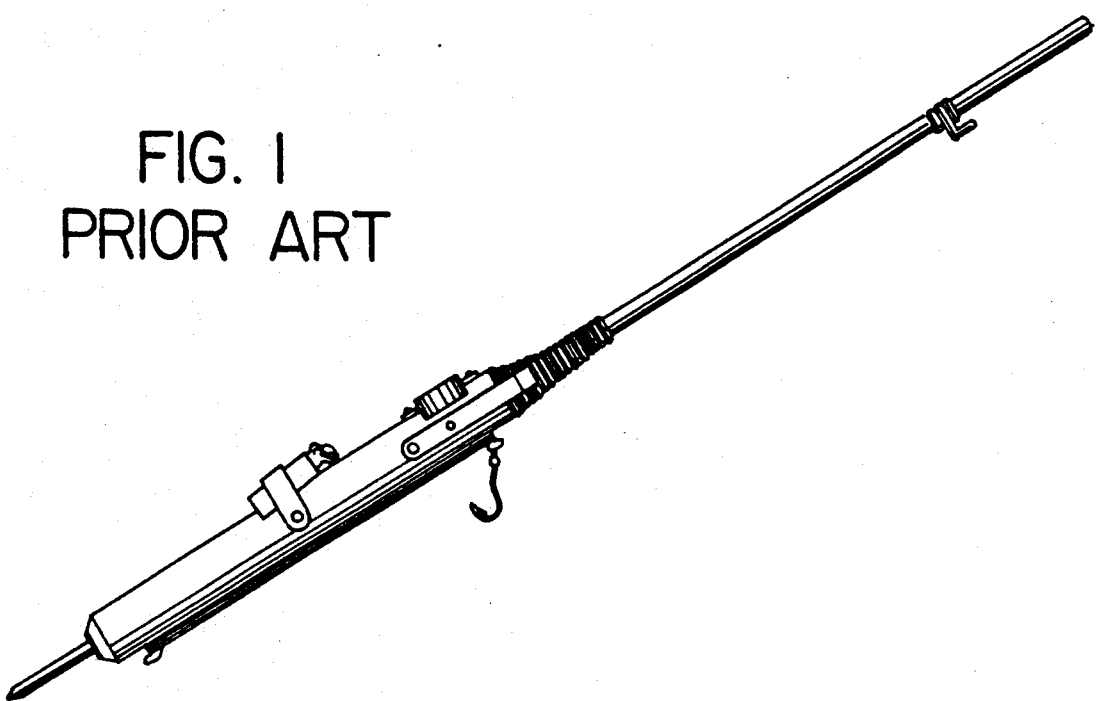
FIG. 1 is an orthographic view of a prior art ice fishing apparatus indicated in U.S. Pat. No. 4,934,091.
Figure 2:
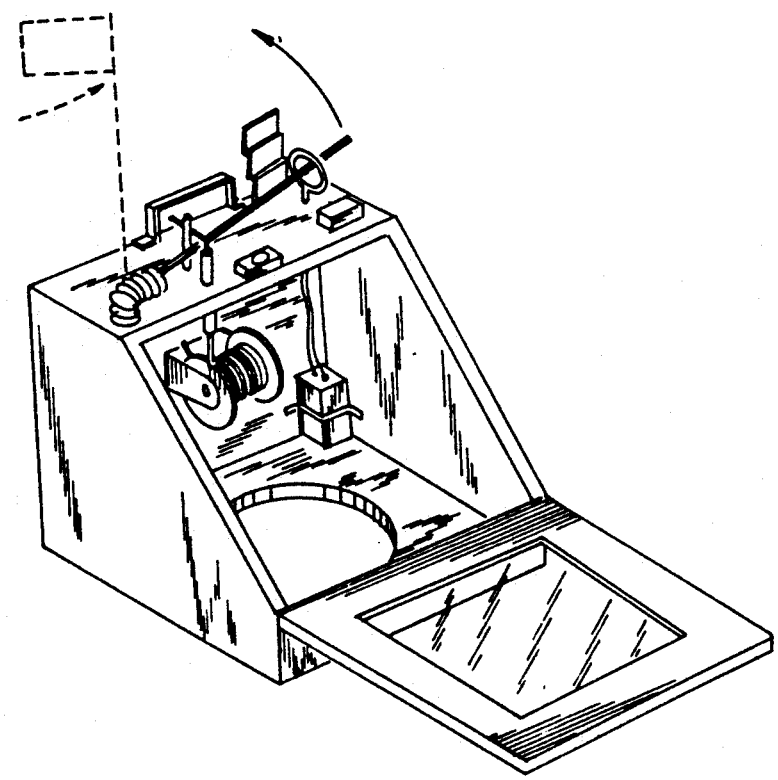
FIG. 2 is an isometric illustration of a prior art ice fishing apparatus as indicated in the U.S. Pat. No. 4,980,986.

With reference now to the drawings, and in particular to FIGS. 1 to 4a thereof, a new and improved ice fishing apparatus embodying the principles and concepts of the present invention and generally designated by the reference numerals 10 and 10a will be described.

Figure 3:
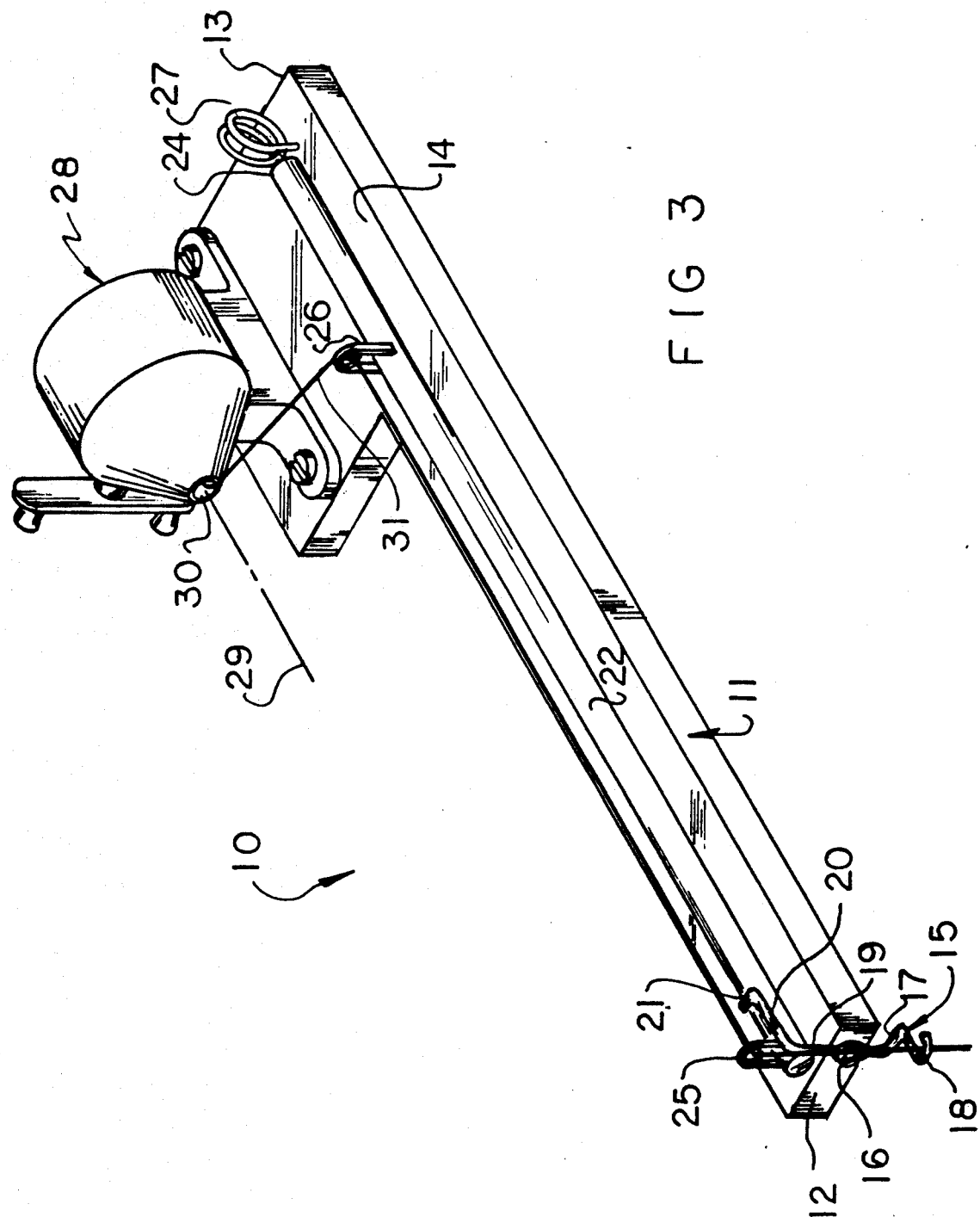
FIG. 3 is an isometric illustration of the instant invention.
Figure 4:
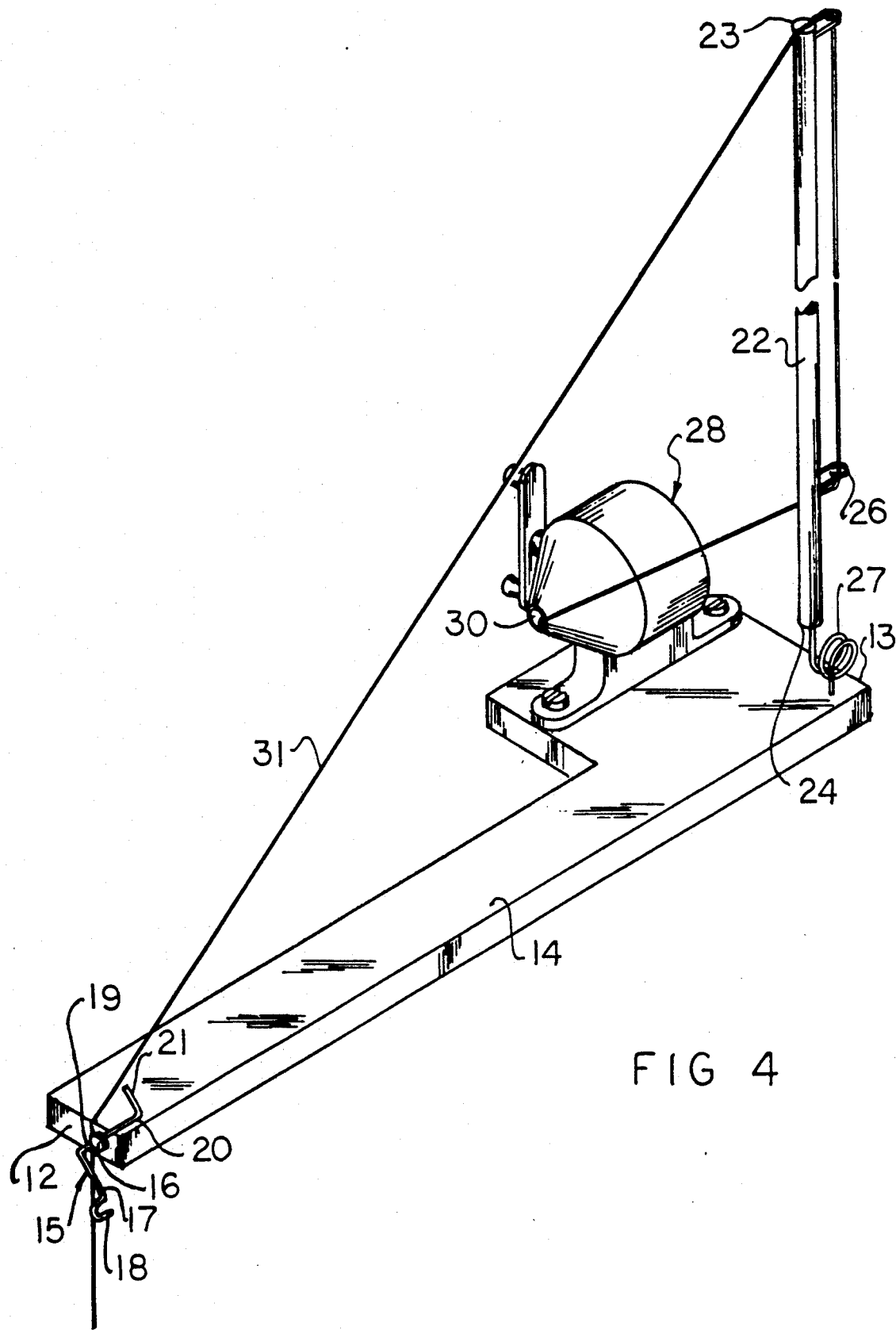
FIG. 4 is an isometric illustration of the invention in a second position.

More specifically, the ice fishing apparatus 10 of the instant invention essentially comprises a base plate 11 having a base plate first end 12 spaced from a base plate second end 13. The base plate 11 is formed with a planar top surface 14 including a hook member 15 pivotally mounted about a hook member axle 16 that is orthogonally directed into the base plate first end 12. It should be noted that the base plate first end and the base plate second end are arranged at an oblique angle relative to the top surface 14. The hook member 15 includes a hook member first leg 17 having a first leg U-shaped hook 18 at a free end of the first leg. A hook member second leg 19 having a second leg first end and a second leg second end, with the second leg first end orthogonally mounted to the first leg spaced from the U-shaped hook 18, with the second leg second end including a hook member third leg 20 orthogonally mounted thereto, with the hook member third leg having a hook member fourth leg orthogonally mounted to the hook member third leg spaced from the hook member second leg. The hook member fourth leg 21 is arranged to overlie a forward end portion of a lift rod 22 to position the lift rod 22 in a first position, as illustrated in FIG. 3. A lift rod first end 23 and a lift rod second end 24 are arranged, with the lift rod first end 23 having a first end guide loop 25 mounted adjacent the lift rod first end, with the lift rod second end 24 including a lift rod second end guide loop 26 spaced from the second end 24, wherein the first and second guide loops are coaxially aligned to direct a fishing line 31 therethrough in aligned relationship. The lift rod second end includes a spring member 27 to bias the lift rod in a second position, as illustrated in FIG. 4, orthogonally oriented relative to the top surface 14 from a first position, wherein the lift rod is parallel to the top surface 14. A fishing reel 28 is oriented in a laterally spaced relationship relative to the lift rod, wherein the fishing reel 28 includes a fishing reel axis 29 that is arranged parallel relative to the lift rod when the lift rod is in the first position. The fishing reel includes a fishing line outlet 30 to direct a fishing line therefrom, wherein the fishing line outlet is positioned rearwardly of the second guide loop 26 and forwardly of the lift rod second end 24. The fishing line 31 is thereby directed along the lift rod and received through the U-shaped hook 18, with the lift rod in the first position, as illustrated in FIG. 3. During a fish strike, the hook member 15 is rotated about the axle 16 disengaging the hook member fourth leg 21 from the lift rod 22 to permit pivotment of the lift rod to the second position, as illustrated in FIG. 4, to simultaneously indicate a fish strike and to "fix" the hook within a fish.

The FIGS. 4a and 3a respectively indicate the use of a modified aspect of the invention permitting the lift rod of a tapered configuration to lift relative to a second orientation, as indicated in FIG. 3a, from a first latched position. The fishing line 31 is initially guided over a guide leg guidance hook 42 of a guide leg 41 fixedly mounted into the lift rod 22 adjacent the lift rod forward end 22a in adjacency to the hook members fourth leg 21. From the guide leg guidance hook 42, the fishing line is directed through a base plate guide loop 40 positioned between the guidance hook 42 and the guide plate's forward or hook end 12. The U-shaped hook 18 thereafter receives the fishing line which is directed into a fishing orientation into an associated body of water, whereupon tensioning directed along the U-shaped hook 18 displaces a fourth leg 21, in a manner as indicated above. The hook member 15, and more specifically the fourth leg 21, is pivotally mounted about a modified hook member axle loop 16a positioned between the lift rod forward end 22a and the guide plate forward end 12.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An ice fishing apparatus, comprising,
    a base plate, the base plate having a base plate first end and a base plate second end spaced at opposed end portions of the base plate, with a base plate top surface extending coextensively between the base plate first end and the base plate second end, the base plate first end and the base plate second end each oriented at a predetermined oblique angle relative to the top surface, and
    a hook member, the hook member having a hook member axle, the hook member axle pivotally mounted adjacent the base plate first end to pivotally mount the hook member relative to the base plate first end, and
    a lift rod, the lift rod including a lift rod first end and a lift rod second end, the lift rod second end including spring means mounted to the lift rod second end and to the base plate top surface adjacent the base plate second end to bias the lift rod orthogonally relative to the top surface in a second position from the first position that is oriented parallel relative to the top surface, and
    a fishing reel mounted to the base plate, the fishing reel having fishing line directed therefrom extending along the lift rod and mounted to the hook member,
    wherein the hook member includes a hook member first leg, including a first leg first end, with the first leg first end including a U-shaped hook to receive the fishing line therethrough, and a first leg second end, the first leg second end including a second leg orthogonally mounted to the first leg, and the second leg including an axle orthogonally directed therethrough, and a third leg orthogonally mounted to the second leg spaced from the first leg, and the third leg including a fourth leg orthogonally mounted to the third leg for mounting over the lift rod to secure the lift rod in the first position, wherein a fish strike rotates the hook member releasing the lift from the first position.

2. An apparatus as set forth in claim 1 wherein the fishing reel includes a fishing reel axis, and the fishing reel axis is oriented parallel to the lift rod when the lift rod is in the first position, and the fishing reel axis orthogonally oriented relative to the lift rod when the lift rod is in a second position.

3. An apparatus as set forth in claim 2 wherein the hook member includes a hook member first leg, including a first leg first end, with the first leg first end including a U-shaped hook to receive the fishing line therethrough, and a first leg second end, the first leg second end including a second leg orthogonally mounted to the first leg, and a third leg orthogonally mounted to the second leg spaced from the first leg, and the third leg including a fourth leg orthogonally mounted to the third leg for mounting over the lift rod to secure the lift rod in the first position, and wherein the fourth leg is pivotally mounted about an axle loop oriented between the lift leg and the base plate first end.

4. An apparatus as set forth in claim 3 wherein a guide leg is fixedly mounted to the lift rod in adjacency to the lift rod first end, the guide leg includes a guidance hook, with the fishing line directed over the guidance hook in the first position, and a base plate guide loop fixedly mounted to the base plate between the guidance hook and the base plate first end receiving the fishing line therethrough, and upon rotation of the hook member, the fishing line is separated from the U-shaped hook.

* * * * *